US012139330B2

(12) United States Patent
McNeilus et al.

(10) Patent No.: US 12,139,330 B2
(45) Date of Patent: Nov. 12, 2024

(54) REFUSE COLLECTION VEHICLE HAVING SLIDE AND SWEEP MECHANISM WITH BOLT-IN BUSHINGS

(71) Applicant: Con-Tech Manufacturing, Inc., Dodge Center, MN (US)

(72) Inventors: Grant McNeilus, Dodge Center, MN (US); Brian Meldahl, Brownsdale, MN (US)

(73) Assignee: Con-Tech Manufacturing, Inc., Dodge Center, MN (US)

( * ) Notice: Subject to any disclaimer, the term of this patent is extended or adjusted under 35 U.S.C. 154(b) by 970 days.

(21) Appl. No.: 17/146,354

(22) Filed: Jan. 11, 2021

(65) Prior Publication Data

US 2022/0219897 A1 Jul. 14, 2022

(51) Int. Cl.
*B65F 3/20* (2006.01)
*F16C 33/06* (2006.01)

(52) U.S. Cl.
CPC .............. *B65F 3/205* (2013.01); *B65F 3/201* (2013.01); *F16C 33/06* (2013.01); *F16C 2226/60* (2013.01); *F16C 2226/62* (2013.01)

(58) Field of Classification Search
CPC .......... B65F 3/205; B65F 3/201; B65F 3/208; F16C 33/06; F16C 2226/60; F16C 2226/62; F16C 33/08
See application file for complete search history.

(56) References Cited

U.S. PATENT DOCUMENTS

| 5,730,576 A | 3/1998 | Odaniel |
| 6,224,318 B1 | 5/2001 | McNeilus et al. |
| 8,007,197 B2 * | 8/2011 | Nye ...................... E02F 3/3636 37/468 |
| 10,633,182 B2 | 4/2020 | Musso et al. |
| 2019/0009983 A1 * | 1/2019 | Musso ...................... B65F 3/20 |

FOREIGN PATENT DOCUMENTS

| EP | 2085331 A1 * | 8/2009 | ............. B65F 3/143 |
| FI | 20195143 A1 * | 2/2009 | |

* cited by examiner

*Primary Examiner* — Saul Rodriguez
*Assistant Examiner* — Lucia Elba Rodriguez
(74) *Attorney, Agent, or Firm* — Craig J. Lervick; Larkin Hoffman Daly & Lindgren, Ltd.

(57) ABSTRACT

Throughout several portions of a refuse collection system, coupling between hydraulic cylinders to related mechanical components are achieved using bolt-in bushings. The bolt-in bushings allow for improved efficiency in the manufacturing process and allow for repairs to be easily carried out by having a cylindrical opening configured to receive an attachment pin and a main body that is configured to be inserted into openings within portions of related mechanical components. The main body has a flange that will support connection holes, thereby allowing for attachment to the operating components of the refuse collection vehicle.

19 Claims, 7 Drawing Sheets

REFUSE COLLECTION VEHICLE HAVING SLIDE AND SWEEP MECHANISM WITH BOLT-IN BUSHINGS

BACKGROUND

Heavy duty mechanical equipment used throughout the world typically includes a unique combination of work pieces, related power supplies and robust components specifically configured to withstand harsh operating environments. In many situations, this equipment includes specially designed mechanical components (i.e. levers, working surfaces, housings, shields, brackets, etc.) and related power actuators (e.g. hydraulic cylinders). In practice, the mechanical systems are all uniquely designed to carry out the desired motions/functions, meet the specific needs of the device, or provide appropriate protection.

With moving components, hydraulic cylinders are typically coupled to mechanical systems at appropriate locations to create the desired motion/movement when the cylinder is extended or retracted. Further, the movable components will be designed to travel along specific paths and to move in prescribed manners, which is dependent upon the design of components, connection points, operation of the cylinder, etc. One unique challenge for these heavy-duty mechanical systems involves the way movement is achieved and how the cylinders are coupled to related moving components. With hydraulic cylinders, a coupling ring will typically be positioned at the end of the hydraulic rod. On the moving components a similar hole (or set of holes) is positioned at the point where force from the cylinder will be received. A coupling pin will be configured to pass through the coupling ring and the hole/holes in the moving component, thereby allowing force to be provided to the moving component. Similarly, pins and related brackets are often used to allow/accommodate rotation of elements with respect to one another. In each of these situations, bushings are typically included to help manage wear and maintain alignment of the coupling pins. These bushings can be designed into the components themselves or can be added as a separate element.

Maintaining alignment of components during the manufacturing process can be challenging, especially when welded bushings are included. As is well recognized by those skilled in the art, welding causes metal parts to be strained, warped, and/or generally deformed. Maintaining tight tolerances is thus very challenging. Also, managing the wear of components can also be challenging.

As also mentioned above, these heavy-duty systems often operate in harsh conditions. Some examples include earth-moving equipment, machines used in mining, garbage collection/hauling trucks, manufacturing systems, etc. Consequently, any efforts to provide additional durability and prolong the life of components is very beneficial.

As mentioned, one application where mechanical systems are used in such harsh conditions is the refuse truck. These trucks include systems to accommodate the collection, packing and transport of refuse. The collection and packing (i.e. compaction) systems often require the use of mechanical components and/or systems such as those highlighted above.

SUMMARY

To provide a refuse truck with improved durability, flexibility and efficiency several aspects of the refuse collection mechanisms are improved in the embodiments of a refuse truck as described below. Further, several details are modified to improve the manufacturability and repairability of the refuse truck.

Throughout the systems and components typically used in a refuse collection vehicle, bushing and related coupling structures are used to carry out necessary functions. Within refuse collection systems, slide and sweep mechanisms are typically used to pull refuse from a collection hopper into a storage compartment. To carry out this function, several hydraulic cylinders are used to move related equipment. In most cases, pins are used to provide the necessary coupling of the driven shaft of the hydraulic cylinder to the related mechanical component. To provide additional efficiency in the manufacturing process and to provide reparability, bolt-in bushing are used in conjunction with these pins. The uses of bolt-in bushings for these situations also reduces the amount of welding necessary, thus also reducing the strain on related mechanical parts traditionally caused by welding.

BRIEF DESCRIPTION OF THE DRAWINGS

Further advantages of the systems, devices and embodiments for improved operations of a refuse truck will be better understood from reading the description set forth below in conjunction with the drawings, in which.

DESCRIPTION

Figure 1:
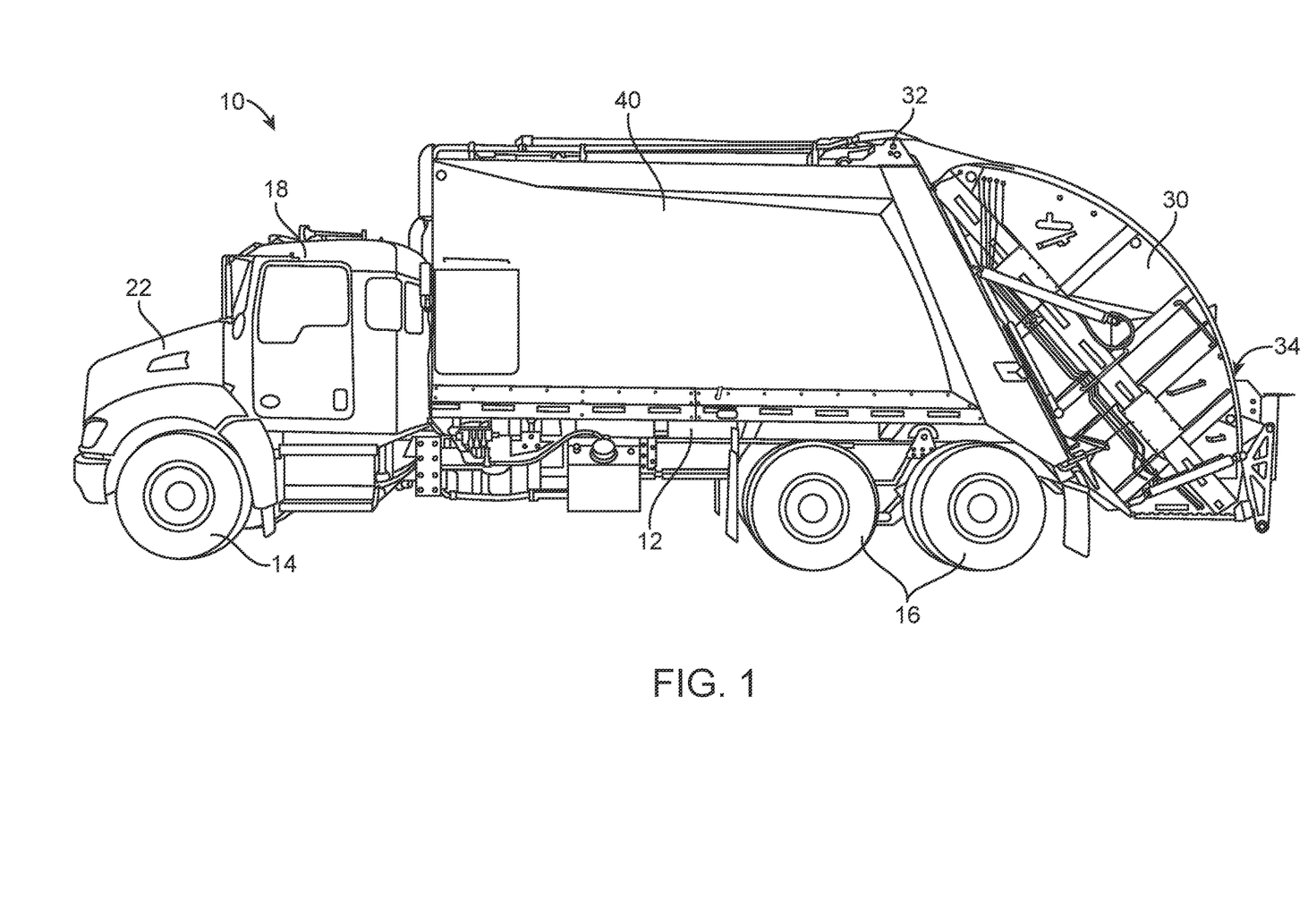
FIG. 1 is a perspective view of an exemplary refuse truck.

Existing refuse collection trucks generally come in one of many different configurations, including a front loader version, side loader version, and rear loader version. As the names suggest, variations in operation and layout drive the way these refuse vehicles operate. Turning now to FIG. 1, one example of a rear loader refuse truck is illustrated. In this embodiment, rear loader refuse truck 10 is shown having a truck frame 12 supported by a pair of front wheels 14, and a set of rear wheels 16. Frame 12 also supports a cab 18 designed to contain several operator controls. As will also be recognized, a motor or engine (not shown) is housed under a front hood 22 and is configured to supply necessary power. Further components which will be clearly understood but are not specifically illustrated include a transmission, hydraulic pumps, an electrical power supply, hydraulic power structures (tubes, valves, etc.), and other operating components. Those skilled in the art will recognize the need and general operation of these components.

Also illustrated in FIG. 1, frame 12 supports and carries a collection mechanism 30 and a main collection body 40 which is has a framework that forms a main collection compartment 42. Main collection body 40 includes various structural members necessary to maintain strength, and other protective elements such as fenders 400. Although not shown, main collection body 40 may also contain a pusher mechanism to cause refuse to be ejected from a rear portion when collection mechanism 30 is hinged upwardly to an unloading or dumping position.

As illustrated in the various figures, collection mechanism 30 will include a bin, hopper or collection area 34 which is designed and configured to easily allow operators to deposit refuse therein. In operation, a sweep and scoop mechanism is used to pull refuse from the collection hopper 34 into main collection compartment 42. In addition, compaction equipment is included so refuse is compacted as collection operations occur, thereby more efficiently utilizing the space and main collection compartment 42. Further, it is typical for collection mechanism 30 to be hingeably mounted to main collection body 40 at an upper hinge point 32. Based upon this connection methodology, the collection mechanism 30 can be swung upward and out of the way, thus allowing main collection compartment 40 to be easily emptied when full.

Figure 2:
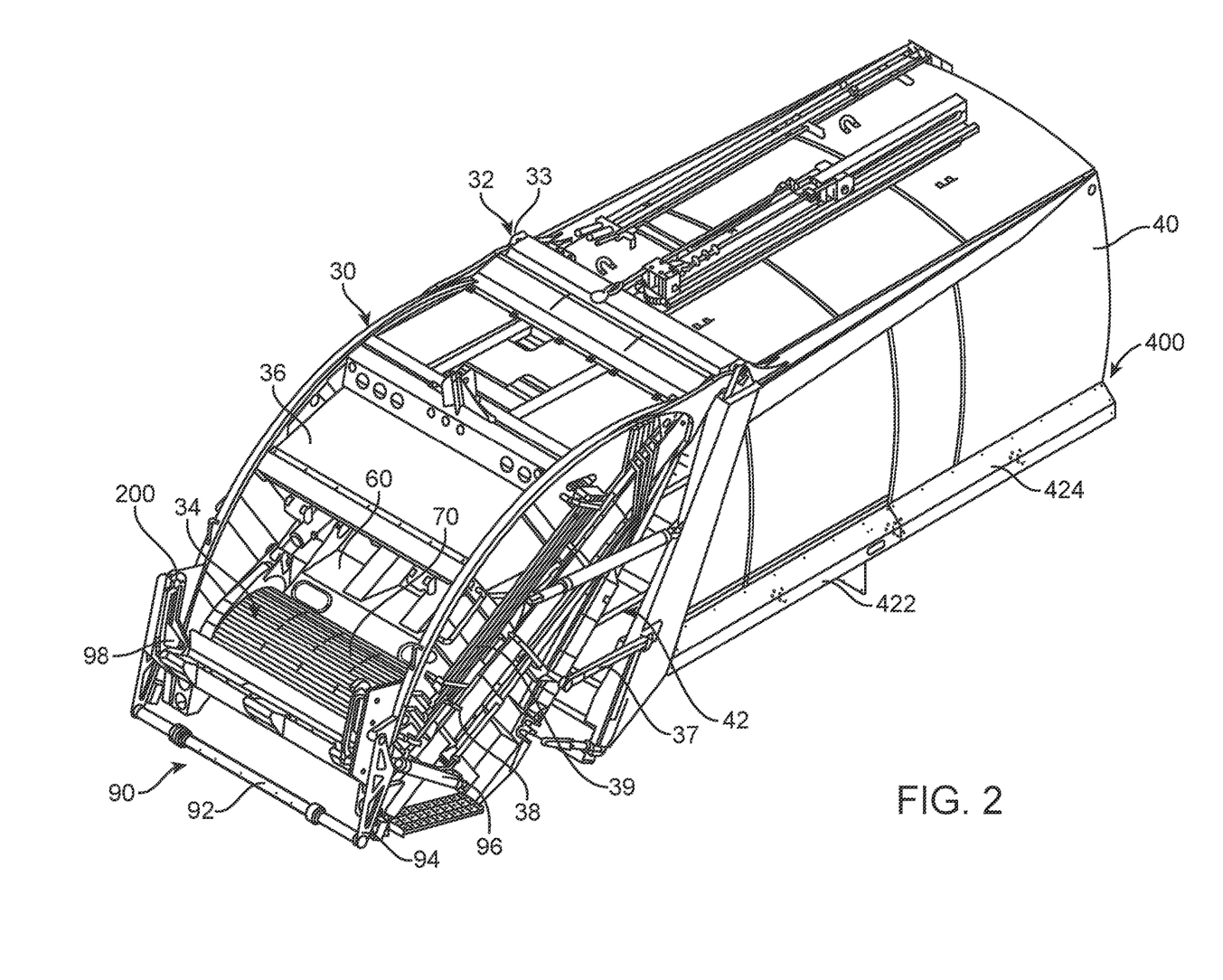
FIG. 2 shows certain details of the refuse collection systems of the exemplary refuse truck shown in FIG. 1.

As suggested above, collection mechanism 30 includes several components which are specifically designed and configured to accommodate the collection of refuse. As one example, FIG. 2 presents a perspective view of the collection mechanism 30 alone, which again is connected to main collection body 40 at hinge point 32 by a hinge connection 33. In FIG. 2 collection mechanism 30 slightly pulled away from main collection body 40 thus exposing a portion of main collection compartment 42. Here, collection mechanism 42 is held in place by a lockout bar 37. It is contemplated that the hinge connection 33 is achieved by appropriate hinge pins to accommodate the hinging of collection mechanism 30 as an entire unit.

One of the operative components included as part of collection mechanism 30 is a slide and sweep mechanism 50, along with associated hydraulic cylinders and related controls. As will be further discussed below, slide and sweep mechanism 50 includes a slide panel 60 and a sweep plate 70. Those skilled in the art will recognize that slide panel 60 and sweep plate 70 are configured to slide downward into collection hopper 34 which is positioned at a lower portion of collection mechanism 30. As is well known, refuse handlers or truck operators typically place or dump refuse into collection chamber 34, either by hand or using appropriate automated mechanisms. When collection hopper 34 is relatively full actuation of slide and sweep mechanism 50 will cause the refuse contained in collection hopper 34 to be scooped inward and into main collection compartment 42. As illustrated, the collection chamber 34 is formed and defined by portions of a main housing or main body 36 which also provides support for all other components such as slide and sweep mechanism 50. Also, several controls 38 and related hydraulic tubing 39 is attached to main body 36 to accommodate operation of the various systems contained or attached thereto. In addition, a tipper mechanism 90 can be attached at a rear portion of collection mechanism 30, and includes a tipping bar 92, a hinge mechanism 94 and related hydraulic cylinders 96. As will be further discussed below, this tipper system 90 allows containers to be positioned adjacent a load edge for collection hopper 34 and can accommodate the automated tipping of refuse containers or collection containers, thus eliminating the need for physical lifting by operators. Further details and structures related to collection mechanism 30 are discussed in detail below.

Figure 3:
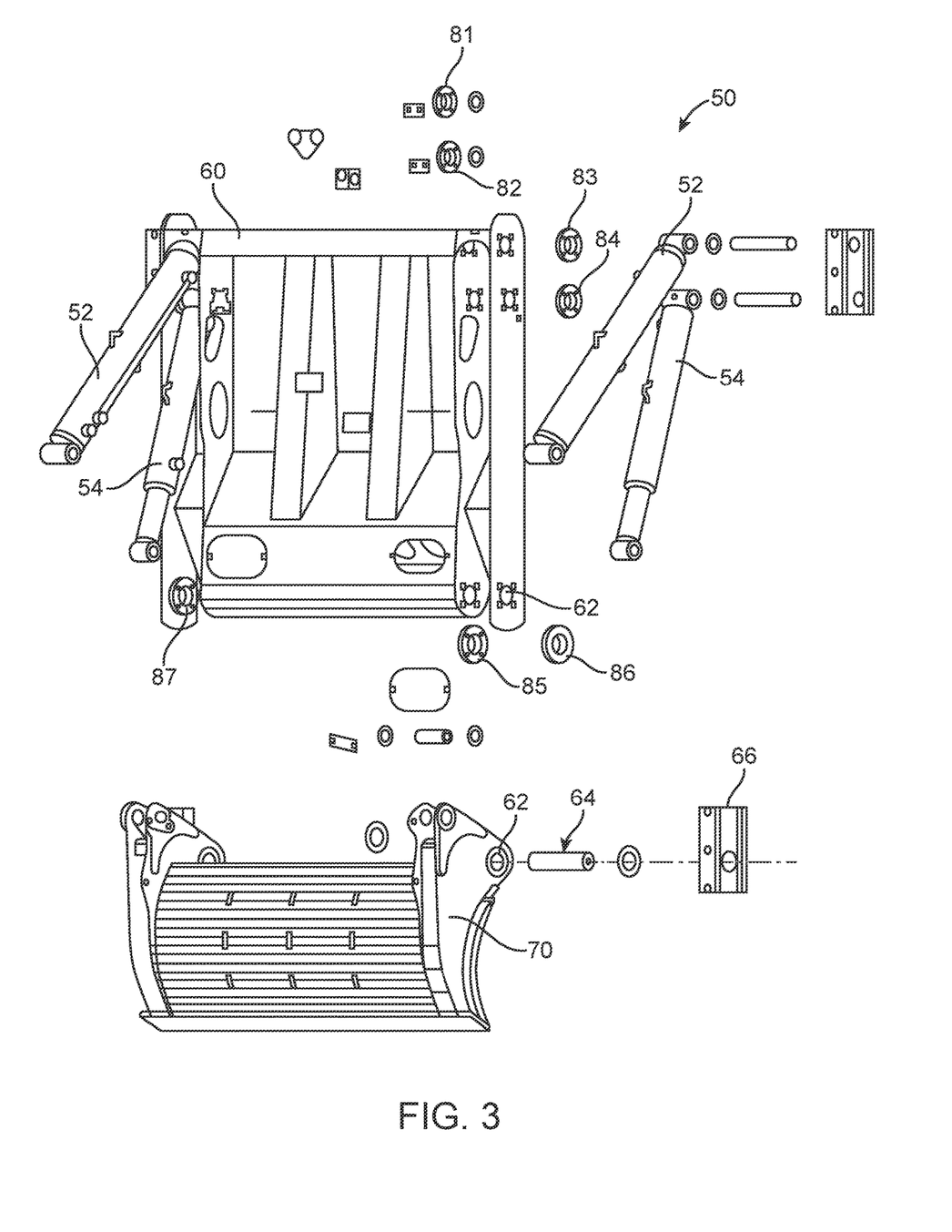
FIG. 3 presents an exploded view of the scoop and sweep mechanism.

Turning now to FIG. 3, the various components of slide and sweep system 50 are illustrated. More specifically, FIG. 3 includes a partially exploded view of the components making up slide and sweep system 50. As shown, and as suggested above, the components of slide and sweep system 50 include slide panel 60 and sweep plate 70. These two components are coupled to one another and cooperate to perform the scooping and transfer of refuse, as discussed above. As will be recognized, slide panel 60 and sweep plate 70 are connected to one another at a main hinge point 62. Generally speaking, this connection is achieved using a primary pin 64 which is inserted through bushings in slide panel 60 and related bushings in sweep plate 70. Primary pin 64 is also coupled with a connecting block 66 and retained by a holing plate (not shown) to further complete the desired rotatable coupling.

FIG. 3 also illustrates several other hinged or rotatable connections using similar connecting pins. In some cases, these connection pins are also coupled to a related hydraulic cylinder in order to allow certain operations or movements to occur. More specifically, it will be appreciated that the use of connecting pins to couple hydraulic cylinders to various components throughout the slide and sweep mechanism 50 provides the necessary ability to supply operational forces while also allowing for necessary rotation of related components. As one example, slide and sweep mechanism further includes a pair of sweep cylinders 52 and a pair of scoop cylinders 54. The pair of sweep cylinders 52 are coupled between slide panel 60 and main body 36 of collection mechanism 30, while the scoop cylinders 54 are coupled between slide panel 60 and sweep plate 70.

Figure 4:
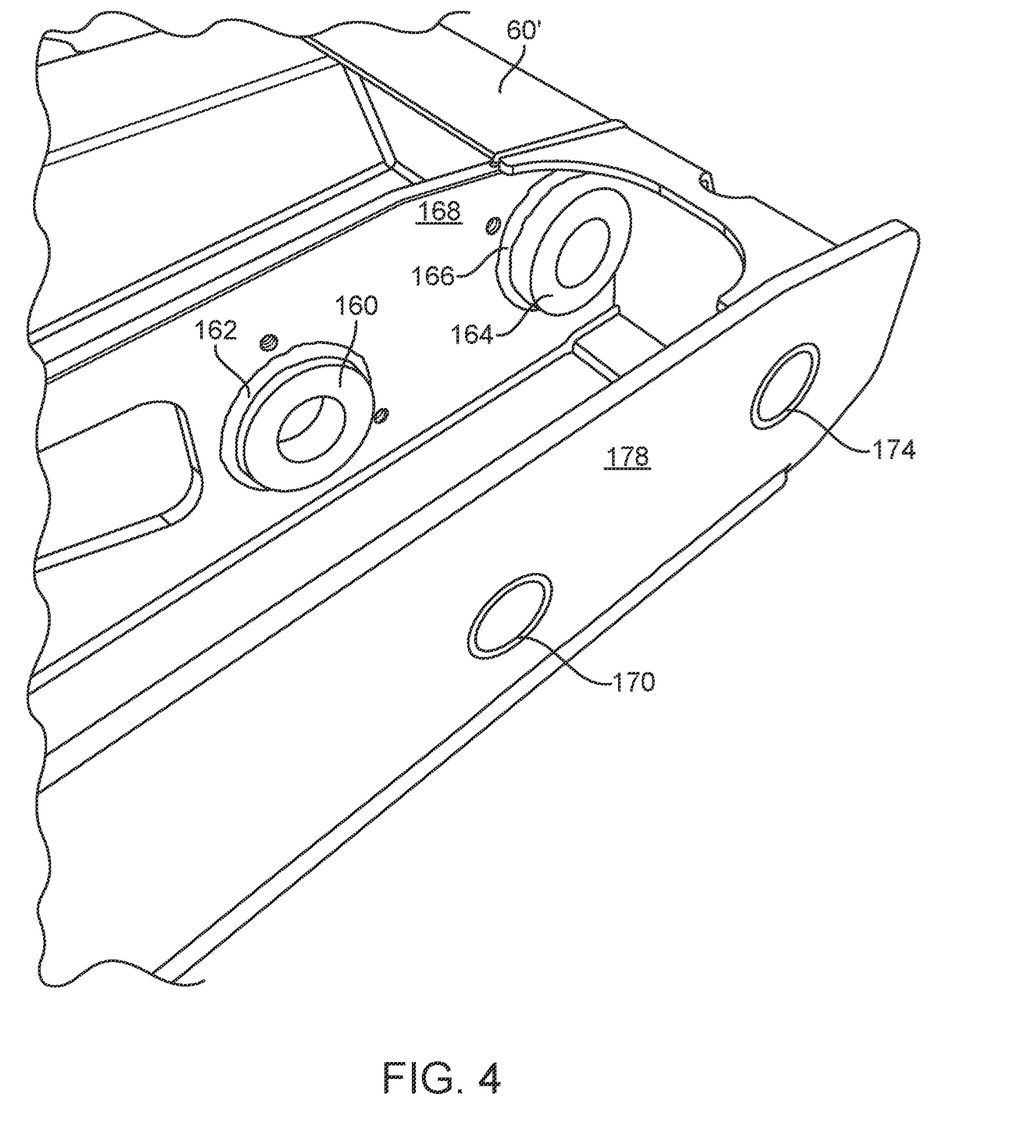
FIG. 4 illustrates one aspect of the prior art bushing structures used in a portion of the slide and sweep mechanism.

Prior art systems have historically achieved rotatable couplings by welding appropriate bushings to various components. FIG. 4 provides one example of this prior art concept. Here, an exemplary slide panel 60' is partially illustrated. In operation, two hydraulic cylinders are attached to this portion of slide panel 60'. In this embodiment of slide panel 60' a first bushing 160 is illustrated as being welded to an inner panel 168 of a slide panel 60'. In this prior art approach, the weld joint 162 provides the desired connection to inter surface 168. Similarly, a second bushing 164 is also welded to internal panel 168 using a similar weld joint 166. It will be noted that similar bushings 172 and 174 are also utilized on an outer panel 178 of a slide panel 60'. As will be recognized, when bushings are welded to other components, several negative consequences can result, such as expansion, shifting and distortion can occur. Since these bushings must be aligned with connection pins and other structures, these negative consequences are very undesirable. To deal with the inevitable negative consequences, it is necessary to either bore, grind or otherwise modify the bushings after they have been installed to ensure proper alignment. As will be anticipated or recognized, this provides an additional manufacturing step and significantly reduces efficiency. To rectify these concerns, altered bushings are utilized in the present embodiments, which greatly eliminate the negative consequences.

Figure 5:
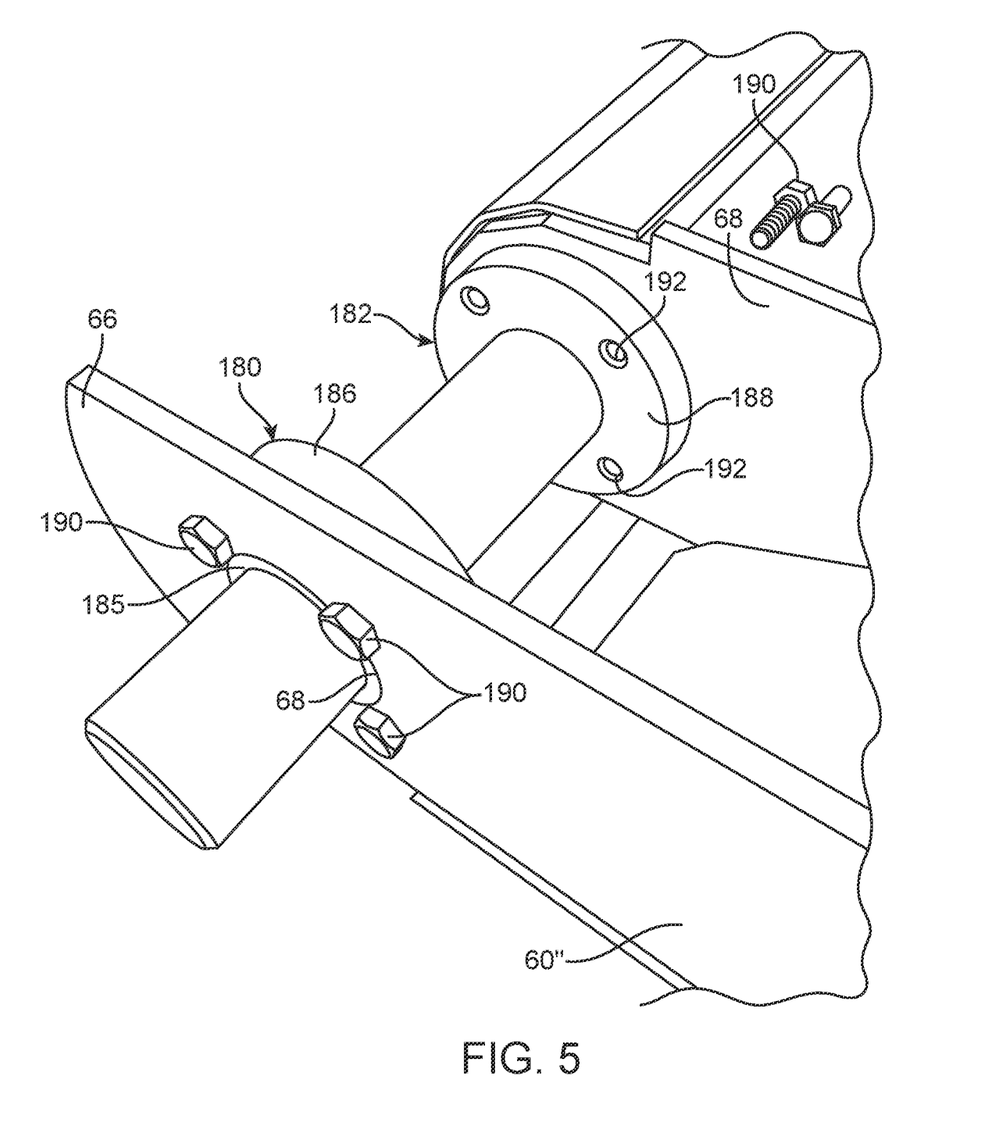
FIG. 5 is a close-up view of an installed bolt-on bushing structure used in the presented embodiments.

Throughout FIG. 3 several bolt-in bushings 81-88 are shown to illustrate a way to more efficiently achieve the necessary coupling of components and to avoid the above-mentioned negative consequences. In addition, several bolt-in bushing are contemplated, but not specifically shown in FIG. 3. Turning now to FIG. 5, an alternative connection methodology using bolt-in bushings is illustrated. More specifically FIG. 5 illustrates a portion of a slide panel 60" with a pair of bolt-in bushings 180 and 182 which are utilized in the improved connection methodology of this embodiment. As further discussed below, first bushing 180 and second bushing 182 are bolt-on bushings which provide further efficiency and consistency in the manufacturing process. In this embodiment, a lower tab 66 of slide panel 60" supports the connection for the above-referenced main hinge point 62. As shown, lower tab 66 includes an opening 68 which is designed and configured to receive a portion of first bushing 180. First bushing 180 includes a step cylindrical extension 185 which is configured to be inserted into opening 68. A main cylindrical body 186 of first bushing 180 is configured to support threaded holes (not shown) designed to accommodate connection bolts 190. To further complete the assembly, connection bolts 190 are threaded into related holes in lower tab 66, thus the connection bolts 190 and bushing 180 to be securely attached. As also illustrated, connection bolts 190 and bushing 182 is similarly connected to an internal surface 68 of slide panel 60". In FIG. 5, it is better illustrated how main body 188 of second bushing 182 includes threaded openings 192. Again, threaded openings 192 are designed and configured to receive connection bolts 190, thus allowing second bushing 182 to also be securely connected to inter surface 68 of slide panel 60".

Figure 6:
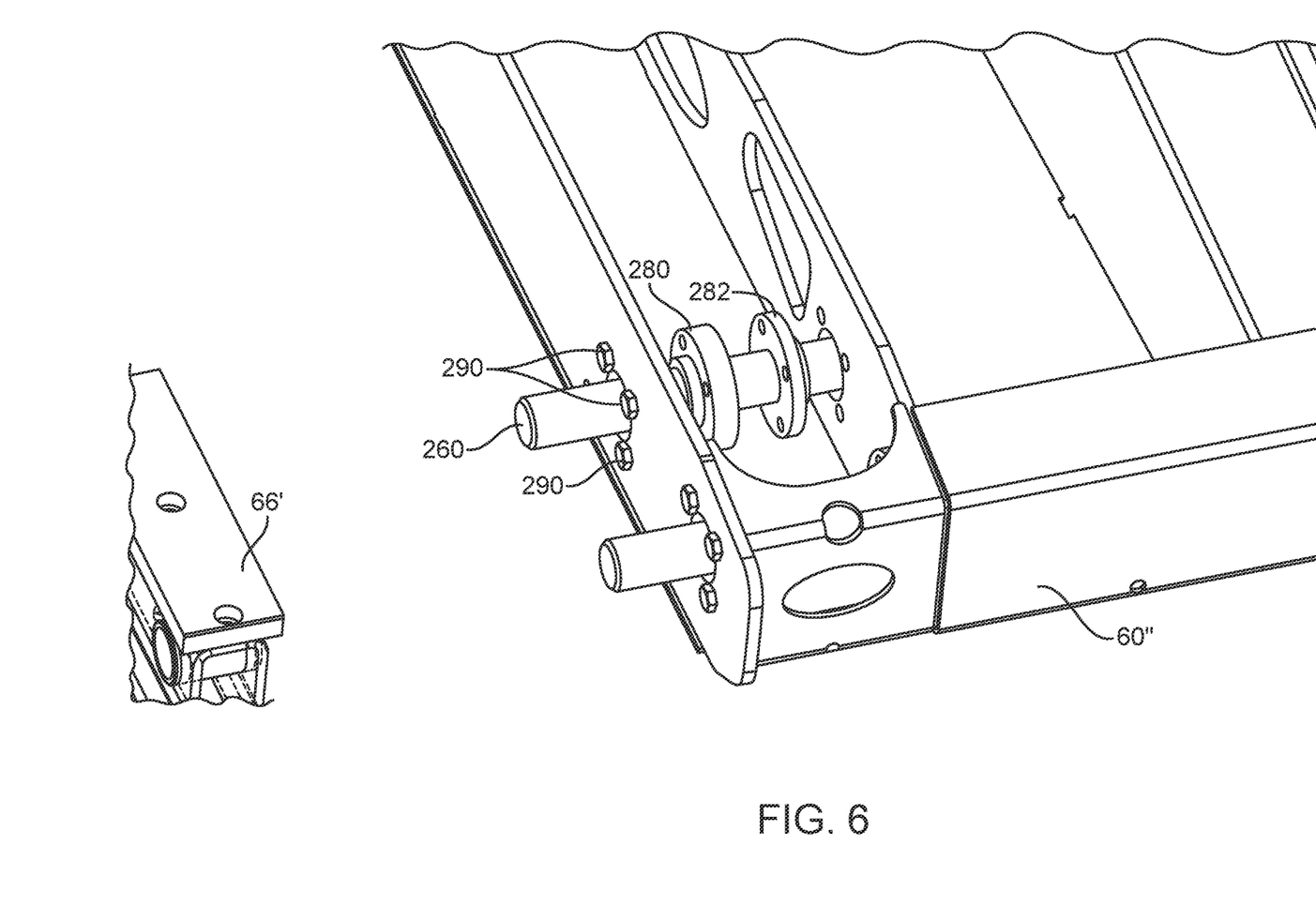
FIG. 6 shows a portion of the slide and sweep mechanism (similar to that shown in FIG. 4) having bolt-on bushings, in a partially assembled state.

In a related manner, FIG. 6 shows an illustration of bolt-in bushings 280 and 282 as used at an opposite end of slide panel 60". In this case, first bolt-in bushing 280 and second bolt-in busing 282 are identical to those shown above in FIG. 5. As shown, the use of first bolt-in bushing 280 and second bolt-in bushing 282 allows for coupling pin 260 to be inserted through openings in each of these components (and openings in slide panel 60") before final assembly is completed. At this point, a plurality of bolts 290 can be used to affix first bolt-in bushing 280 to slide plate 60". Similarly, second bolt-in bushing 282 can also be affixed in the same manner. Clearly, this allows for the alignment of components and simplifies the final assembly process.

Figure 7:
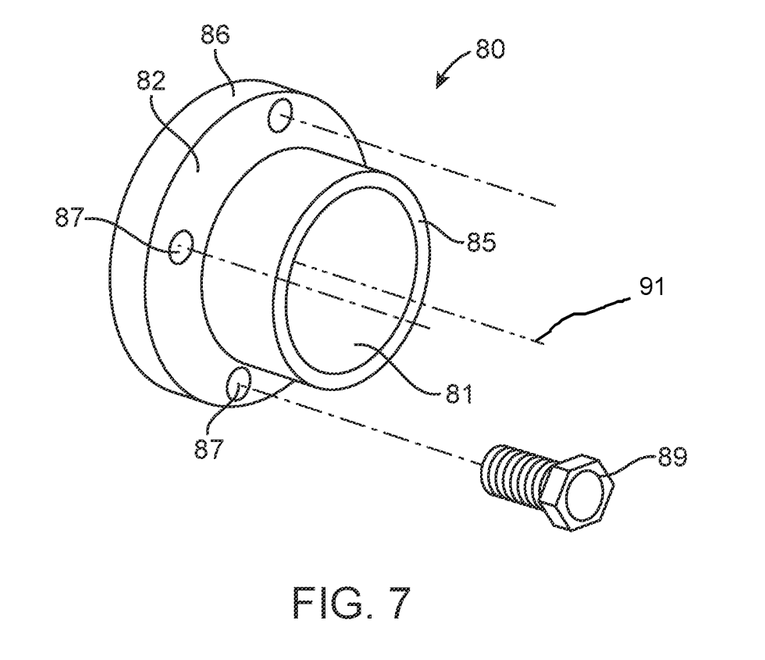
FIG. 7 presents a perspective view of a bolt-on bushing alone.

Turning now to FIG. 7, a more specific view of bolt-in bushing 80 is further illustrated. In this embodiment, bolt-in bushing 80 includes a main cylindrical body 85 at a first end, and a flange or stepped portion 86 at a second end. Further, a main cylindrical body 85 extends outward from facing surface 82 and supports a main opening 81 (which extends along a central axis 91 along the entire length of the bolt-in bushing 80). As will be appreciated, main opening 81 is designed and configured to receive a cooperating attachment pin (not shown in FIG. 7). Flange 86 is designed and configured to support several threaded openings 87 on a facing surface 82, with the facing surface being situated generally perpendicular to central axis 91. Based upon this configuration, bolt-in bushing 80 can be utilized in many different situations, such as those described in relation to the embodiments above. It is contemplated that bolt-in bushings 80, and related pin connection structures are utilized in several places in slide and sweep mechanism 50, as these provide better efficiencies in manufacturing, and prolong life.

As will be appreciated, assembly of various systems and related components can be achieved by first placing bolt-in bushing 80 in an appropriate opening in the related component and subsequently inserting the related connection pin as necessary. At that point, bolts 89 can be used to secure bolt-in bushing 80 at the desired location. Bolt-in bushing 80, and related openings in cooperating components will be configured to have relatively small tolerance with respect to one-another, thus providing the ability to move and shift during the assembly process. Again, once all components are assembled, bolt-in bushing 80 can be firmly affixed at a later point in time (i.e. after all pins and other components have been inserted). Using this methodology, it will generally be unnecessary to machine, grind or otherwise manipulate in lifting bushings during the assembly process. Further, welding of bushings is avoided, thereby eliminating problems related to distortion generally caused by welding processes.

As discussed above, bolt-in bushing 80 is configured to have a plurality of threaded opening 87 which are designed to receive threaded bolts 89. Alternative embodiments could use different connection methods. For example, unthreaded opening could be machined into bolt-on bushing, and a bolt/nut combination could be used for attachment purposes. Rivets and other alternative are also possible.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A packing system for use in a refuse truck, comprising:
   a framework forming an enclosed refuse containing compartment having a receiving opening;
   a collection mechanism hingably coupled to the framework and positioned adjacent the receiving opening, the collection mechanism further having a collection hopper and a slide and sweep system, wherein the slide and sweep system comprises at least one movable component which is configured to travel along a predetermined path so as to move refuse from the collection hopper into the refuse containing compartment;
   a plurality of hydraulic actuators configured to cause movement of the slide and sweep system along the predetermined path;
   a plurality of removable bushings removably coupled to the at least one movable component at predetermined locations, wherein each removable bushing comprises a main body defining a cylindrical opening extending along a central axis from a first end surface to a second end surface, the cylindrical opening configured to receive a coupling pin, wherein the main body of each removable bushing further has a flange at the first end configured so that the main body has a width at the first end which is larger than a width at the second end, with the flange further having a facing surface on an inner side thereof which is substantially perpendicular to the central axis and facing the second end, the flange further supporting a plurality of attachment holes; and
   a plurality of connectors coupling the removable bushings to the at least one movable component;
   wherein portions of the at least one movable component has a plurality of recesses sized and configured to receive the second end of the plurality of bushings and wherein the plurality of connectors are inserted into the attachment holes to achieve coupling, and wherein the plurality of bushings are used to achieve coupling between the hydraulic actuators and the at least one movable component.

2. The packing system of claim 1 wherein the attachment holes are threaded openings and wherein the coupling connectors are bolts configured to be threaded into the threaded openings.

3. The packing system of claim 1 wherein the plurality of connectors are bolts inserted through the attachment holes, and nuts are coupled to the bolts to achieve attachment of the bushings to the at least one movable component.

4. The packing system of claim 1 wherein the openings in the bushing are configured to receive a pin so as to achieve coupling to the plurality of hydraulic actuators.

5. An actuator system for generating movement of a first component with respect to a second component, the actuator system comprising:
- a hydraulic cylinder having a main body coupled to the first component via a first coupling system and a movable piston coupled to the second component via a second coupling system, wherein the first coupling system and the second coupling system comprise:
- a coupling pin;
- a coupling ring configured to receive the coupling pin;
- a bolt-in bushings also configured to receive the coupling pin, wherein the bolt-in bushing comprises a main body defining a cylindrical opening extending along a central axis from a first end surface to a second end surface, the cylindrical opening configured to receive the coupling pin, wherein the main body of each bushing further has a flange at the first end configured so that the main body has width at the first end which is larger than the width at the second end, with the flange further having a facing surface on an inner side thereof which is substantially perpendicular to the central axis and facing the second end, the flange further supporting a plurality of attachment holes; and
- a plurality of connectors configured to interact with the attachment holes in the plurality of bolt-in bushing so as to provide connections to the first component and the second component.

6. The actuator system of claim 5 wherein plurality of connectors comprise bolts.

7. The actuator system of claim 6 wherein the attachment holes are threaded and wherein the bolts are configured to interact with the threaded holes.

8. The actuator of claim 7 wherein the first coupling system and the second coupling system each comprise a retainer plate configured to be received within a retaining slot in the coupling pin, and wherein the retainer plate is further coupled to the first component and the second component.

9. The actuator of claim 7 wherein the main body has one of the coupling rings attached thereto and the movable piston has one of the coupling rings attached thereto.

10. The actuator of claim 9 wherein the first component and the second component are parts of a refuse collection vehicle.

11. The actuator of claim 10 wherein the first component and the second component are parts of a slide and sweep mechanism of the refuse collection vehicle.

12. The packing system of claim 1 wherein the slide and sweep system comprises a slide panel and a sweep plate coupled to one another and configured to scoop refuse contained in the collection hopper and move it to the containing compartment.

13. The packing system of claim 1 wherein the second end of each of the plurality of removable bushings are substantially cylindrical and the plurality of recesses in the at least one movable component are circular and configured to receive the cylindrical portions of the second end of the plurality of removable bushings, and wherein the plurality of recesses are further sized so that the flange is larger than each of the plurality of recesses.

14. The packing system of claim 13 wherein the plurality of connectors comprise a plurality of bolts which are coupleable to the at least one movable component via bolts or threaded holes in the at least one movable component.

15. The actuator system of claim 5 wherein the second end of the bolt-in bushing is substantially cylindrical.

16. A removable bushing assembly configured to be attachable to a movable component in a manner which will allow the movable component to receive forces that will result in movement of the movable component, the removable bushing assembly comprising:
- a main body having a first end and a second end, the main body further defining a cylindrical opening extending along a central axis from the first end to the second end, the cylindrical opening configured to receive a coupling pin, wherein the main body further has a flange at the first end configured so that the main body has width at the first end which is larger than the width at the second end, with the flange further having a facing surface on an inner side thereof which is substantially perpendicular to the central axis and is facing the second end, the flange further supporting a plurality of attachment holes therein which extend in a direction substantially parallel to the central axis; and
- a plurality of connectors configured to interact with the attachment holes in the flange and a selected portion of the movable component so as to provide connections therebetween.

17. The removable bushing assembly of claim 16 wherein the main body is substantially cylindrical at the second end, and the flange at the first end also substantially cylindrical, with the flange having a greater diameter than the substantially cylindrical second end.

18. The removable bushing of claim 16 wherein the plurality of connectors are bolts and the attachment holes are threaded so as to receive the bolts.

19. The removable bushing of claim 16 wherein the plurality of connectors comprise bolts configured to be inserted through the attachment holes and a plurality of holes in the movable component, and a plurality of nuts coupled to the bolts to provide connection.

\* \* \* \* \*

UNITED STATES PATENT AND TRADEMARK OFFICE
CERTIFICATE OF CORRECTION

| | | |
|---|---|---|
| PATENT NO. | : 12,139,330 B2 | Page 1 of 1 |
| APPLICATION NO. | : 17/146354 | |
| DATED | : November 12, 2024 | |
| INVENTOR(S) | : Grant McNeilus and Brian Meldahl | |

It is certified that error appears in the above-identified patent and that said Letters Patent is hereby corrected as shown below:

In the Claims

In Claim 5, at Column 7 at Line 14, delete "bushings" and insert -- bushing --.

Signed and Sealed this
Fourteenth Day of January, 2025

Derrick Brent
*Acting Director of the United States Patent and Trademark Office*